May 16, 1950  F. N. PIASECKI  2,507,993
TANDEM ROTOR HELICOPTER

Filed Dec. 16, 1946  2 Sheets-Sheet 1

Inventor
Frank N. Piasecki
By John D. Myers
Attorney

May 16, 1950      F. N. PIASECKI      2,507,993
TANDEM ROTOR HELICOPTER

Filed Dec. 16, 1946      2 Sheets-Sheet 2

Inventor
Frank N. Piasecki
By John D. Myers
Attorney

Patented May 16, 1950

2,507,993

UNITED STATES PATENT OFFICE 2,507,993

TANDEM ROTOR HELICOPTER

Frank N. Piasecki, Lansdowne, Pa., assignor to Piasecki Helicopter Corporation, Morton, Pa.

Application December 16, 1946, Serial No. 716,494

12 Claims. (Cl. 244—17.23)

This invention relates generally to aircraft provided with sustaining rotors mounted in tandem and is a continuation-in-part of my application Serial Number 497,394, filed August 4, 1943, now abandoned. More particularly, the invention deals with improvements in the construction of helicopter fuselages and the manner in which the rotors are mounted, whereby more efficient and stable flight is achieved.

A notable deficiency of helicopters of known design is their lack of stability, particularly stability about the yaw axis, when in normal forward flight. In helicopters of previous design stability has been maintained almost entirely by the action of the rotors, the stabilizing forces being transmitted from the rotors to the fuselage through the rotor shafts. These stabilizing forces inherent in the rotor action are of two kinds, viz., gyroscopic, due to the rotation of the rotor, and directive, due primarily to cyclic pitch. It can readily be seen that neither of these forces contributes much to stability of the helicopter about its yaw axis. Gyroscopic force of the rotors will not prevent the aircraft from rotating about its yaw axis since the rotor axes are parallel to the yaw axis and are merely translated along a circular path around it when a yawing moment is introduced in the aircraft. Likewise, the directive forces of the rotors are ineffectual as yaw stabilizers unless the cyclic pitch is continuously adjusted to compensate for yawing moments resulting from any external or pilot-controlled force acting on the fuselage. Common yaw-inducing forces found in helicopters are wind forces applied differentially about the yaw axis; differences in torque resulting from differences in pitch of the blades carried by the two rotors; and overcorrections by the pilot when making adjustments in differential pitch or cyclic pitch to correct a fault in the attitude or direction of the aircraft. Thus, in helicopters of known design, minor deliberate or accidental changes in cyclic pitch of one rotor, or minor changes in total pitch of one rotor, or other forces effective to produce a moment about the yaw axis of the aircraft, will cause the aircraft to rotate about such axis; that is to say, the aircraft lacks stability about its yaw axis.

Another common deficiency in present helicopters is that they require the use of cyclic pitch in all but the hovering flight attitude. It would be desirable to construct a helicopter capable of maintaining its most frequently used flight attitudes without the necessity of using cyclic pitch, thereby effecting a considerable economy of power and fuel and, at the same time, reducing vibration and prolonging the life of the cyclic control mechanism. To increase the over-all efficiency of multi-rotor tandem helicopters, it would also be desirable to operate the several rotors in different planes to avoid contact of the aft blades with the turbulent air created by the forward rotor, and to achieve this advantage without the use of pylons or booms carried externally of the fuselage.

Accordingly, it is an object of the present invention to provide a helicopter in which the aft portion of the fuselage is shaped in the form of an airfoil to provide stability to the aircraft about its yaw axis.

Another object is to provide an airfoil aft portion of a helicopter fuselage effective as a mounting for the aft rotor and to maintain the plane of such rotor above that of the forward rotor when the helicopter is in forward flight attitude.

An additional object is to provide a multi-rotor helicopter wherein the rotors lie in different planes and their actual axes tilted forward when the helicopter is in forward flight attitude, and wherein the axes of the rotors are substantially vertically disposed when the aircraft is hovering or in vertical flight attitude.

A further object is the provision of a helicopter capable of forward and vertical flight substantially without the use of cyclic pitch.

It is another object of the invention to provide a helicopter having a pair of rotors mounted in tandem and embodying the foregoing features, and wherein both the rotors are supported without the use of external pylons or booms.

With the above and other objects in view, the nature of which will appear as the description proceeds, the invention consists of the construction and combination of parts described and claimed hereinafter, two embodiments of which are illustrated in the accompanying drawings wherein:

Figure 2:
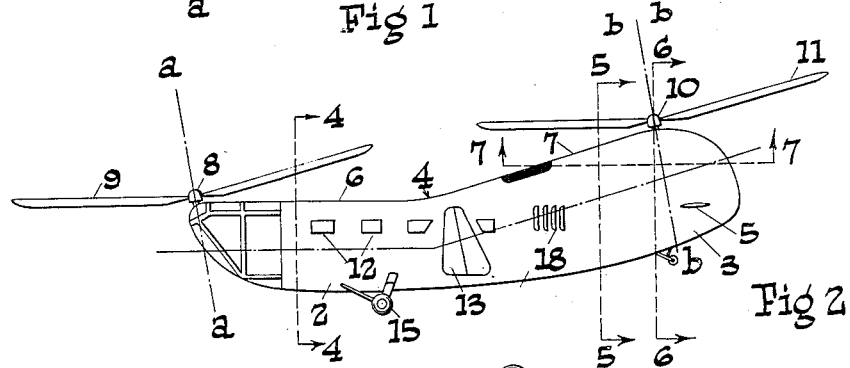
Fig. 2 is a side elevational view of the helicopter shown in Fig. 1 and illustrates the forward flight attitude of the aircraft.
Figure 4:
Figure 5:
Figure 6:
Figure 7:
Figure 3:
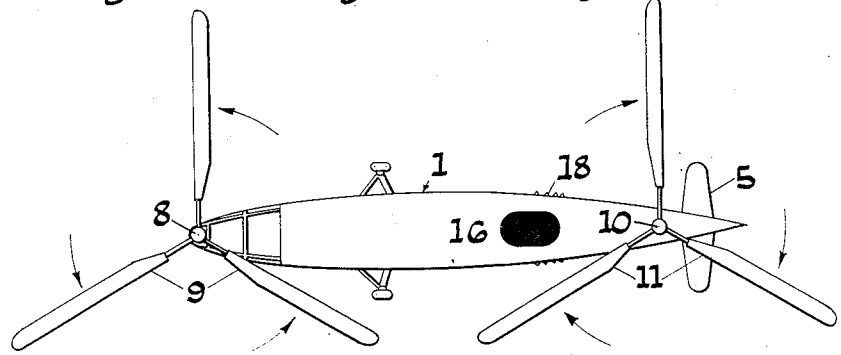
Fig. 3 is a plan view of the helicopter depicted in Fig. 1.

Figs. 4, 5, 6 and 7 are cross-sectional views of the fuselage only, taken along lines 4—4, 5—5, 6—6 and 7—7, respectively, of Fig. 2, in the direction of the arrows.

Figure 8:
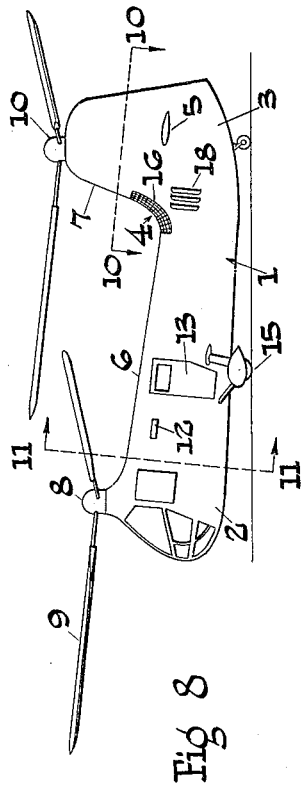

Fig. 8 is a side elevational view of a modification of a helicopter made in accordance with the present invention.

Figure 9:
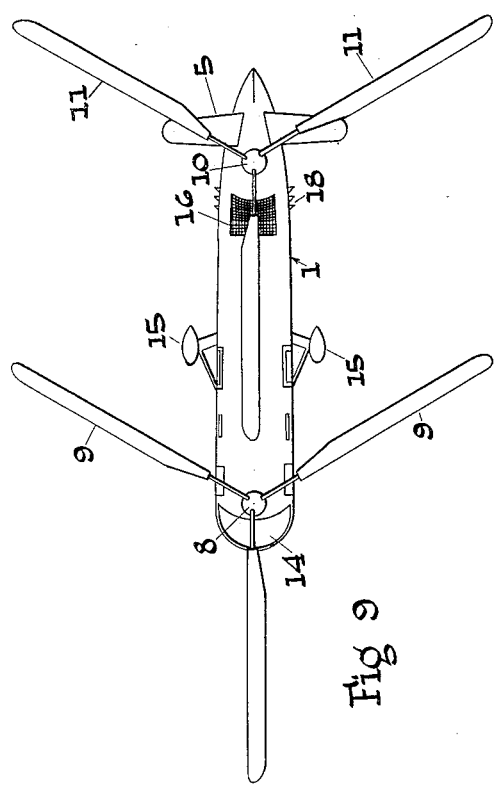

Fig. 9 is a plan view of the helicopter shown in Fig. 8.

Figures 10, 11:

Fig. 10 is a cross-sectional view of the aft portion of the helicopter shown in Fig. 8, taken along line 10—10 in the direction of the arrows.

Fig. 11 is a cross-sectional view of the fuselage only, taken along lines 11—11 of Fig. 8 in the direction of the arrows.

In the drawings, like parts are designated by the same reference numerals.

Figure 1:
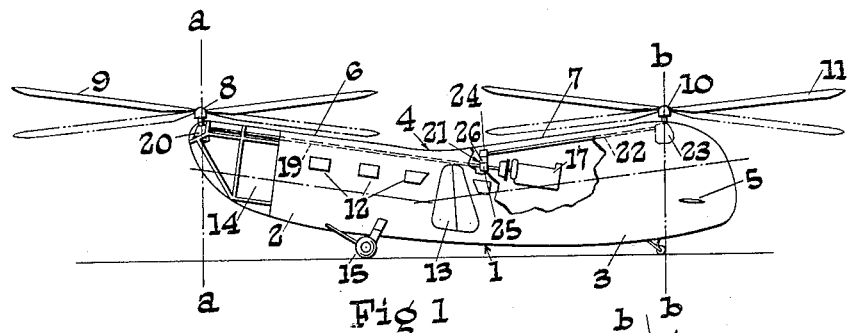
Fig. 1 is a side elevational view of a helicopter embodying the improved construction details of the present invention and shows the helicopter in its hovering or vertical flight attitude, or at rest on the ground.

Referring now to the drawings, and particularly to Figs. 1 and 2, it can be seen that my improved helicopter includes a fuselage, indicated generally as 1, having a forward portion 2 and an aft portion 3 joined to and extending rearwardly from the forward portion. The forward and aft portions of the fuselage are angularly related to one another to form a downwardly convergent obtuse angle having its apex 4 at the junction of said portions. A horizontal tail plane 5 is carried by the rearward end of the aft portion 3 to increase the stability of the helicopter about the pitch axis. The forward and aft portions 2 and 3 are characterized by substantially straight top surfaces 6 and 7, respectively, when viewed in profile as in Figs. 1 and 2, and these top surfaces define the straight sides of the obtuse angle described above, the purpose of which will be described hereinafter. A rotor comprising a hub 8, carrying blades 9, is mounted on the forward portion 2, with the hub positioned above and adjacent the upper surface. A second rotor comprising a hub 10, carrying blades 11 is similarly mounted on the aft portion 3 of the fuselage. The blades 9 and 11 may be rigid or articulated, as desired. The rotating shafts of the rotors are so journaled in the fuselage that their axes a—a and b—b are substantially vertical and parallel to each other when the helicopter is resting on the ground or in vertical flight attitude, as shown in Fig. 1.

The forward portion of the fuselage is substantially oval in vertical cross-section (Fig. 4), and this shape is substantially maintained rearwardly until the forward portion merges with the aft portion of the fuselage. The fuselage then progressively narrows as it extends rearwardly to provide airfoil qualities to the aft portion 3. At the same time the vertical dimension of the aft portion preferably progressively increases rearwardly substantially to the point of attachment of the rear rotor. If desired, the aft portion 3 need not progressively increase in vertical dimension rearwardly. It is important, however, if yaw stability is to be preserved, that the aft portion extend angularly upwardly from the forward portion and decrease progressively in transverse dimension, while maintaining a substantial vertical dimensions throughout its length.

The fuselage is provided with windows 12, a door 13, a pilot's compartment 14 and landing gear 15. The landing gear is so arranged on the fuselage that the rotative axes of the rotor shafts are vertical when the helicopter is at rest on the ground, as noted above. In the forwardly sloping upper surface of aft portion 3 is an opening or air-scoop 16 through which cooling air may be admitted to a power plant, such as a gasoline engine 17, positioned in the aft portion of the fuselage. An exhaust opening 18 is provided in the side of the fuselage adjacent the engine 17. Power is transmitted to the forward rotor through a drive shaft 19 and a gear reduction box 20, and to the aft rotor through a gear unit 21, a drive shaft 22 and a gear reduction box 23. The drive shafts 19 and 22 are preferably just below and substantially parallel to the upper surfaces 6 and 7 of the fuselage to afford the maximum stowage space in the fuselage.

Mechanical features of the power plant, power transmission system, gear boxes and hub assemblies will not be described in detail since they, per se, do not constitute part of the present invention. It is sufficient to point out that satisfactory helicopter engines, transmissions and hub assemblies are well known in the art, and may be used with good results in my improved helicopters. With any transmission system employed, however, it is important that the rotors be made to rotate in opposite directions. In the embodiment shown in Fig. 1, counter rotation of the rotors is realized by interposing the gear unit 21 between shafts 19 and 22, the gear unit comprising gears 24 and 25 fixed to the shafts and mechanically coupled by an idler gear 26. Suitable known means (not shown) for collectively and cyclically adjusting the pitch of the several rotor blades are also employed in my improved helicopter.

It will be readily understood from the drawings and from the foregoing description that my invention teaches the construction of helicopters of greatly improved stability and flight characteristics, in addition to effecting considerable savings in fuel and maintenance costs. For example, the fuselage construction herein described permits the rotors to be mounted in close proximity to its upper surface while maintaining ample clearance for the blades, thus eliminating the extra drag and weight caused by the use of pylons or booms used by helicopters prior to this invention. These benefits are achieved without diminishing in any way the freedom of movement of the blades vertically at all points in the cone described by their rotation, ample clearance being assured by the V-shaped upper surface of the fuselage.

A further advantage gained by the configuration which I employ in my improved fuselage construction, and by the specific arrangement of the rotors, is that these features render it unnecessary to use cyclic pitch in the most used flight attitudes (vertical and forward flight) thereby effecting an appreciable saving of power and fuel and, additionally, reducing vibrations and prolonging the life of the cyclic control mechanism, resulting in a material decrease in maintenance costs. To understand how these benefits are realized by my helicopter construction, attention is directed first to Fig. 1 wherein the helicopter is shown at rest on the ground or in the hovering or vertical flight attitude. By this attitude the rotor axes a—a and b—b are vertical, and the horizontal planes containing the hubs of both rotors substantially coincide. The horizontal planes containing the hubs 8 and 10 need not necessarily coincide, of course, and a modification of the invention in which the hubs are in different horizontal planes is shown in Fig. 8. To gain any desired altitude, it can be seen that cyclic pitch is not necessary since the thrust of the rotor blades is directed vertically downwardly. To commence forward flight, the pitch of the aft rotor blades 11 is increased, thereby lifting the aft portion of the fuselage (Fig. 2). For most efficient flight the aft portion 3 is raised until the forward portion 2 is substantially horizontal and presents the smallest drag area to the airstream. With the helicopter in the attitude shown in Fig. 2, the rotor axes a—a and b—b are tilted forwardly, in which position the rotating blades have a forward driving component which moves the aircraft in that direction. Therefore, no cyclic pitch is necessary to provide the thrust needed for forward flight. Also, with the aft rotor thus raised above the level of the forward rotor, its blades may rotate in the air stream undisturbed by such forward rotor, further increasing the flight efficiency of the helicopter.

It should be noted that in the helicopters of my invention the rotor shafts are mounted for rotation about a fixed axis relative to the fuselage. Therefore, when it is stated herein that the rotor axes are tilted out of the vertical position, it is to be understood that such tilting is controlled by the attitude of the entire fuselage, and does not mean a tilting of the rotor shafts with respect to the fuselage.

Increased stability of the helicopter, another important feature of my invention, is gained by the airfoil construction of the aft portion 3 of the fuselage, which construction is most clearly represented in Figs. 1, 2, 3, 6 and 7. With this construction, when the helicopter is in forward flight, substantially the entire aft portion 3 functions as a yaw stabilizer, the portion thereof above the horizontal plane of the forward rotor being in the airflow undisturbed by such rotor or by the forward portion of the fuselage. Attention is directed to the cross-sectional shape of the aft portion shown in Figs. 7 and 10, where it will be noted that the width of the section is less than 30% of its length. This relationship preferably holds true for substantially the entire aft portion 3, and particularly for that part of the aft portion projecting above a rearward extension of the top surface of the forward portion of the fuselage. Superior airfoil qualities are thereby imparted to the entire aft portion of the fuselage, and this construction, together with the upswept aft portion, constitutes an important part of my invention.

By means of the novel relationship between the engine, transmission and fuselage, a number of other important advantages are attained. For example, the upswept aft portion permits the engine to be positioned so that its forward drive shaft may lie immediately below and parallel to the upper surface of the forward portion. This arrangement permits a single shaft transmission between engine and rotor assembly, obviating the necessity for universal joints, and affords the greatest amount of space for passengers and cargo. Furthermore, the arrangement provides ample clearance between the engine and the upper surface of the aft portion for the aft drive shaft and the gear unit 24, again making it unnecessary to use universal joints.

An additional advantage of my improved fuselage construction is that the angular disposition of the aft portion relative to the forward portion of the fuselage provides a most convenient and aerodynamically sound location for the air-scoop 16. With the air-scoop in the position indicated in Figs. 2 and 8, it is not only in position to take in air when the helicopter is in forward flight, but may also take advantage of the down blast of the rear rotor when in vertical flight, and this is accomplished without the use of protuberances on the fuselage that add extra weight and drag as has been done on helicopters prior to this invention.

Figs. 8 and 9 depict a helicopter essentially the same as that described above, but with certain modifications to illustrate changes in form contemplated by the present invention. In this construction, the forward portion 2 of the fuselage 1 is seen to be much longer than the aft portion 3; also, the aft portion 3 rises higher and more abruptly from the top surface of the fuselage than is the case in the embodiment first described. The junction of the portions 2 and 3 therefore forms an angle 4 only slightly larger than 90° at the intersection of top surfaces 6 and 7. In this modification it will also be observed that the cones of rotation of the rotor blades 9 and 11 overlap one another but the blades are kept from possible collision by a geared transmission system (not shown), similar to that shown in Fig. 1, by which the blades are synchronized to cause any given blade of one rotor to enter the angular space between the two adjacent blades of the other rotor. Other details of the construction depicted in Figs. 8 and 9 need not be described since they have substantially the same structure and function as like parts treated in the above description of the construction of Figs. 1 and 2.

What I desire to claim is:

1. A helicopter comprising a fuselage, rotors mounted on the fore and aft ends of the fuselage, said rotors being driven by longitudinally disposed shafts connected to a power plant located in the aft portion of the fuselage, the shaft driving the front rotor being located directly under and substantially parallel with the upper surface of the forward portion of the fuselage, the shaft driving the rear rotor being connected in driven relation to the front rotor drive shaft and being located directly under and substantially parallel with the upper surface of the aft portion of the fuselage, the transverse dimensions of said aft portion decreasing and the vertical dimensions increasing rearwardly to form a vertical stabilizer and mount for the rear rotor, said aft portion being inclined upwardly and rearwardly to place the vertical stabilizer portion and the rotor mounted thereon above the plane of the front rotor when the helicopter is in forward fllight attitude, and to place said rotors in the same horizontal plane when the helicopter is in hovering attitude.

2. A tandem rotor helicopter comprising an elongated fuselage and a lift rotor mounted at each end of said fuselage, said fuselage including a forward portion and an aft portion joined to and extending rearwardly from said forward portion, said portions having a common vertical dimension at their juncture, said forward portion exhibiting no increase in vertical dimension forwardly from said juncture, said aft portion throughout its length being vertically elongated and ovoid in cross-section, said aft portion increasing progressively in vertical dimension, and decreasing progressively in transverse horizontal dimension, rearwardly from said juncture to a point adjacent the rear end of the fuselage, whereby, when said forward portion is disposed horizontally, said aft portion extends vertically to a level above the top of said forward portion and constitutes a vertical stabilizer effective to stabilize the helicopter about its yaw axis in forward flight.

3. A tandem rotor helicopter comprising an elongated fuselage and a lift rotor mounted at each end of said fuselage, said fuselage including a forward portion and an aft portion joined to and extending rearwardly from said forward portion, said portions having a common vertical dimension at their juncture, said aft portion throughout its length being vertically elongated, said aft portion increasing progressively in vertical dimension and decreasing progressively in transverse dimension rearwardly from said juncture to a point adjacent the rear end of the fuselage, whereby, when said forward portion is disposed horizontally, said aft portion extends vertically to a level above the top of said forward portion and constitutes a vertical stabilizer effective to stabilize the helicopter about its yaw axis in forward flight.

4. A tandem rotor helicopter comprising an elongated closed fuselage and a lift rotor mounted directly upon said fuselage at each end thereof, said fuselage including a forward portion and an aft portion joined to and extending rearwardly from said forward portion, said portions having a common vertical dimension at their juncture, said forward portion being vertically elongated and ovoid in cross-section, said aft portion throughout its length being vertically elongated, said aft portion increasing progressively in vertical dimension and decreasing progressively in transverse dimension rearwardly from said juncture to a point adjacent the rear end of the fuselage, whereby, when said forward portion is disposed horizontally, said aft portion extends vertically to a level above the top of said forward portion and constitutes a vertical stabilizer effective to stabilize the helicopter about its yaw axis in forward flight.

5. A tandem rotor helicopter comprising an elongated closed fuselage and a lift rotor including a rotor shaft mounted at each end of said fuselage, said fuselage including a forward portion and an aft portion joined to and extending rearwardly from said forward portion, said aft portion throughout its length being vertically elongated, said aft portion being inclined upwardly and rearwardly with respect to said forward portion and decreasing progressively in transverse dimension rearwardly from said juncture to a point adjacent the rear end of the fuselage, whereby, when said forward portion is disposed horizontally, said aft portion extends vertically to a level above the top of said forward portion and constitutes a vertical stabilizer effective to stabilize the helicopter about its yaw axis in forward flight, the shafts of said rotors being so positioned in said fuselage as to be substantially vertical when the helicopter is in hovering attitude and tilted forwardly when said forward portion is disposed horizontally.

6. A tandem rotor helicopter in accordance with claim 5 including landing gear so arranged thereon as to position said shafts substantially vertically when the helicopter is at rest on the ground.

7. A tandem rotor helicopter comprising a fuselage including a forward portion and an aft portion joined to and extending rearwardly from said forward portion, said portions having a common vertical dimension at their juncture, the top surface of said forward portion being inclined upwardly forwardly of said juncture when said helicopter is in hovering attitude, the top surface of said aft portion being inclined upwardly rearwardly of said juncture when said helicopter is in hovering attitude, a lift rotor mounted directly upon said fuselage at each end thereof, the axes of said rotors being parallel to each other and inclined forwardly with respect to a longitudinal axis of said helicopter substantially parallel to said top surface of said forward portion, said rotor axes being substantially vertical when said helicopter is in hovering attitude, said aft portion throughout its length being vertically elongated, said aft portion increasing progressively in vertical dimension and decreasing progressively in transverse dimension rearwardly from said juncture to a joint adjacent the rear end of the fuselage, whereby, when said forward portion is disposed horizontally, said aft portion extends vertically to a level above the top of said forward portion and constitutes a vertical stabilizer effective to stabilize the helicopter about its yaw axis in forward flight.

8. A tandem rotor helicopter comprising a fuselage including a forward portion and an aft portion joined to and extending rearwardly from said forward portion, said forward portion being ovoid in cross-section, the top surface of said forward portion being substantially parallel to a primary longitudinal axis of said helicopter, said primary axis being the axis of minimum drag of said helicopter, the top surface of said aft portion extending upwardly rearwardly from said primary axis, said aft portion throughout its length being vertically elongated, said aft portion increasing progressively in vertical dimension and decreasing progressively in transverse horizontal dimension rearwardly to a point adjacent the rear end of said fuselage, whereby, when the top surface of said forward portion is disposed horizontally said aft portion extends vertically to a level above the top of said forward portion and constitutes a vertical stabilizer effective to stabilize the helicopter about its yaw axis in forward flight, a lift rotor mounted at each end of said fuselage, the rear rotor being farther removed upwardly from said primary axis than the forward rotor, the axes of said rotors being parallel to each other and inclined forwardly with respect to said primary axis so that when said helicopter is in hovering attitude the axes of said rotors are vertical and when said primary axis is disposed horizontally said rotor axes are tilted forwardly to produce a component for forward motion of said helicopter, a plurality of blades carried by said rotors, said blades being independently adjustable in pitch, and means including a gasoline engine for driving said rotors in opposite directions.

9. A helicopter in accordance with claim 8 wherein the horizontal cross-sectional areas of substantially all of that part of the vertical length of the said aft portion above a rearward extension of the top surface of said forward portion are characterized by having their widths less than 30% of their respective lengths, which areas are defined by planes cutting said aft portion parallel to said primary longitudinal axis, the major axes of said areas being disposed in a fore-and-aft direction.

10. A tandem rotor helicopter comprising an elongated fuselage and a lift rotor mounted at each end of said fuselage, said fuselage including a forward portion and an aft portion joined to and extending rearwardly from said forward portion, said portions having a common vertical dimension at their juncture, said aft portion throughout its length being vertically elongated and decreasing progressively in transverse horizontal dimension rearwardly from said juncture to a point adjacent the rear end of said fuselage, the tops of said forward and aft portions respectively being substantially straight when viewed in side elevation and forming the sides of a downwardly converging obtuse angle having its apex at said juncture, whereby, when the top of said forward portion is disposed horizontally said aft portion extends vertically to a level above the top of said forward portion and constitutes a vertical stabilizer effective to stabilize the helicopter about its yaw axis in forward flight.

11. A helicopter in accordance with claim 10 wherein each of said lift rotors comprises a hub, an axial shaft and a plurality of airfoil blades mounted on said shaft, and wherein said helicopter includes a power plant including a gasoline engine carried by said aft portion, transmission means coupling said power plant with said shafts to rotate the latter in opposite directions, and an air-scoop for directing cooling air to said engine, said air-scoop being disposed in the upper surface of said aft portion and beneath the surface generated by the blades of the aft rotor, whereby said air-scoop is effective to entrap air from the relative wind created by said rotor and by forward motion of said helicopter through the air, said axial shafts being parallel to each other and disposed in said fuselage so as to be substantially vertical when said helicopter is in the hovering attitude and tilted from the vertical in a forward direction when the top of said forward portion is disposed horizontally.

12. A tandem rotor helicopter comprising an elongated fuselage, a lift rotor mounted at each end of said fuselage, said fuselage including a forward portion and an aft portion joined to and extending rearwardly from said forward portion, the top of said aft portion being inclined upwardly of said forward portion rearwardly of their junction, and a power plant located in said aft portion, said power plant including a drive shaft extending forwardly to the lift rotor in said forward portion, said power plant being so disposed in said aft portion as to position said drive shaft substantially parallel to and adjacent the top of said forward portion.

FRANK N. PIASECKI.

REFERENCES CITED

The following references are of record in the file of this patent:

UNITED STATES PATENTS

| Number | Name | Date |
|---|---|---|
| 2,023,105 | Smith | Dec. 3, 1935 |
| 2,273,303 | Waldron | Feb. 17, 1942 |
| 2,429,646 | Pullin | Oct. 28, 1947 |

FOREIGN PATENTS

| Number | Country | Date |
|---|---|---|
| 155,974 | Switzerland | Oct. 1, 1932 |